(12) United States Patent
Takahashi et al.

(10) Patent No.: US 10,966,270 B2
(45) Date of Patent: Mar. 30, 2021

(54) USER EQUIPMENT AND BASE STATION

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/099,882

(22) PCT Filed: Mar. 22, 2017

(86) PCT No.: PCT/JP2017/011366
§ 371 (c)(1),
(2) Date: Nov. 8, 2018

(87) PCT Pub. No.: WO2017/195471
PCT Pub. Date: Nov. 16, 2017

(65) Prior Publication Data
US 2019/0141770 A1    May 9, 2019

(30) Foreign Application Priority Data
May 11, 2016   (JP) .............................. JP2016-095633

(51) Int. Cl.
*H04W 48/18* (2009.01)
*H04W 88/06* (2009.01)
(Continued)

(52) U.S. Cl.
CPC ............. *H04W 76/16* (2018.02); *H04W 8/24* (2013.01); *H04W 16/32* (2013.01); *H04W 48/18* (2013.01);
(Continued)

(58) Field of Classification Search
CPC ....... H04W 8/24; H04W 16/32; H04W 48/18; H04W 72/04; H04W 72/0453;
(Continued)

(56) References Cited

U.S. PATENT DOCUMENTS

| 10,263,729 B2* | 4/2019 | Vikberg ................. H04L 1/0001 |
| 2012/0176967 A1* | 7/2012 | Kim ....................... H04W 76/36 370/328 |

(Continued)

FOREIGN PATENT DOCUMENTS

| EP | 2879439 A1 | 6/2015 |
| JP | 2013197820 A | 9/2013 |

(Continued)

OTHER PUBLICATIONS

Huawei et al., "Enhancement of LCP Procedure for UL Split Bearer," 3GPP TSG-RAN WG2 Meeting #85bis, R2-141154, Valencia, Spain, Mar. 31-Apr. 4, 2014 (Year: 2014).*

(Continued)

*Primary Examiner* — Brian P Cox
(74) *Attorney, Agent, or Firm* — Osha Bergman Watanabe & Burton LLP (57) ABSTRACT

Provided is a technique for achieving simultaneous communication with a plurality of wireless communication systems using different radio access techniques.
An aspect of the invention relates to a user equipment that supports simultaneous communication with a first wireless communication system and a second wireless communication system using different radio access techniques. The user equipment includes a transmitting and receiving unit that transmits and receives radio signals to and from a first base station in the first wireless communication system and a second base station in the second wireless communication system and a capability information notification unit that (Continued)

transmits, to the first base station or the second base station, capability information related to the simultaneous communication with the first wireless communication system and the second wireless communication system.

2 Claims, 3 Drawing Sheets

(51) Int. Cl.
| | | |
|---|---|---|
| *H04W 76/16* | (2018.01) | |
| *H04W 16/32* | (2009.01) | |
| *H04W 72/04* | (2009.01) | |
| *H04W 8/24* | (2009.01) | |
| *H04W 88/10* | (2009.01) | |
| *H04B 7/0426* | (2017.01) | |
| *H04B 7/06* | (2006.01) | |

(52) U.S. Cl.
CPC ......... *H04W 72/04* (2013.01); *H04W 72/048* (2013.01); *H04W 72/0453* (2013.01); *H04W 88/06* (2013.01); *H04W 88/10* (2013.01); *H04B 7/043* (2013.01); *H04B 7/0626* (2013.01)

(58) Field of Classification Search
CPC ... H04W 72/048; H04W 76/16; H04W 88/06; H04W 88/10; H04B 7/043; H04B 7/0626
See application file for complete search history.

(56) References Cited

U.S. PATENT DOCUMENTS

| | | |
|---|---|---|
| 2014/0023013 A1 | 1/2014 | Lee et al. |
| 2015/0055572 A1* | 2/2015 | Ishikura .............. H04W 72/048 370/329 |

FOREIGN PATENT DOCUMENTS

| | | |
|---|---|---|
| JP | 2014236353 A | 12/2014 |
| WO | 2015/174904 A1 | 11/2015 |

OTHER PUBLICATIONS

Hluawei, HiSilicon; "Enhancement of LCP procedure for UL split bearer"; 3GPP TSG-RAN WG2 Meeting #85bis R2-141154; Valencia, Spain, Mar. 31-Apr. 4, 2014 (3 pages).
Samsung; "5G Radio Protocol Architecture"; 3GPP TSG-RAN WG2 Meeting #93bis R2-162207; Dubrovnik, Croatia, Apr. 11-15, 2016 (9 pages).
InterDigital Communications; "Control Plane Aspects for Interworking between NR and LTE"; 3GPP TSG-RAN WG2 #93bis R2-162785; Dubrovnik, Croatia, Apr. 11-15, 2016 (5 pages).
3GPP TS 36331 V13.1.0; 3rd Generation Partnership Project; Technical Specification Group Radio Access Network; Evolved Universal Terrestrial Radio Access (E-UTRA); Radio Resource Control (RRC); Protocol specification (Release 13); Mar. 2016 (551 pages).
3GPP TS 36300 V13.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Dec. 2015 (290 pages).
3GPP TS 36306 V13.1.0; 3rd Generation Partnership Project; Technical Specification Group Radio Access Network; Evolved Universal Terrestrial Radio Access (E-UTRA); User Equipment (UE) radio access capabilities (Release 13); Mar. 2016 (53 pages).
International Search Report issued for PCT/JP2017/011366, dated Jun. 13, 2017 (5 pages).
Written Opinion issued for PCT/JP2017/011366, dated Jun. 13, 2017 (9 pages).
Extended European Search Report in counterpart European Application No. 17795832.9 dated Nov. 18, 2019 (9 pages).

* cited by examiner

FIG.1

LTE-NR Dual Connectivity

USER EQUIPMENT AND BASE STATION

TECHNICAL FIELD

The present invention relates to a wireless communication system.

BACKGROUND ART

In recent years, a fifth-generation (5G) communication standard has been discussed as a next generation communication standard of Long Term Evolution (LTE) and LTE-Advanced. One object of a new radio access technique (NR) in the fifth-generation communication standard is to achieve tight interworking between an NR system, and an LTE system and an LTE-Advanced system. Dual connectivity (LTE-NR dual connectivity) configured by the LTE system or the LTE-Advanced system (hereinafter, referred to as an LTE system) and the NR system is considered as a candidate of the technique for achieving the tight interworking.

Figure 1:
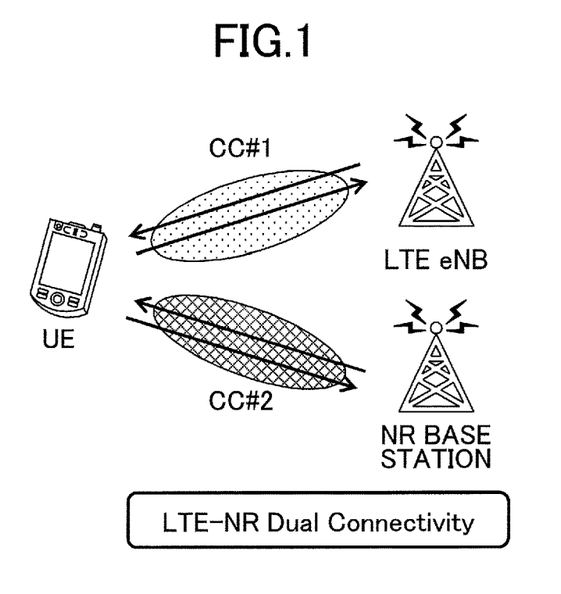
FIG. 1 is a diagram schematically illustrating LTE-NR dual connectivity.

In LTE-NR dual connectivity, as illustrated in FIG. 1, a user equipment (UE) performs simultaneous communication with a base station (evolved NodeB (eNB)) in the LTE system and a base station in the NR system. Specifically, as illustrated in FIG. 1, the user equipment performs the simultaneous communication, using an LTE carrier CC #1 provided by the LTE base station and an NR carrier CC #2 provided by the NR base station at the same time.

CITATION LIST

Non-Patent Document

Non-Patent Document 1: R2-162207
Non-Patent Document 2: R2-162785
Non-Patent Document 3: 3GPP TS 36.306 V13.1.0 (2016 March)

SUMMARY OF THE INVENTION

Problem to be Solved by the Invention

The LTE system and the NR system are likely to use independent radio resource control (RRC) processes. In this case, it is assumed that one of the two systems is not capable of understanding the UE category or the UE RRC configuration used by the other system. In this case, preferably, the LTE system and the NR system do not need to understand UE capability information or configuration and achieve LTE-NR dual connectivity.

However, in the related art, the details of capability information related to LTE-NR dual connectivity which is transmitted (notified) by the user equipment supporting LTE-NR dual connectivity have not been discussed.

The invention has been made in view of the above-mentioned problems and an object of the invention is to provide a technique for achieving simultaneous communication with a plurality of wireless communication systems using different radio access techniques.

Means for Solving Problem

In order to achieve the object, according to an aspect of the invention, there is provided a user equipment that supports simultaneous communication with a first wireless communication system and a second wireless communication system using different radio access techniques. The user equipment includes a transmitting and receiving unit that transmits and receives radio signals to and from a first base station in the first wireless communication system and a second base station in the second wireless communication system and a capability information notification unit that transmits, to the first base station or the second base station, capability information related to the simultaneous communication with the first wireless communication system and the second wireless communication system.

According to another aspect of the invention, there is provided a base station in a first wireless communication system. The base station includes a communication control unit that controls communication with a user equipment and a second base station in a second wireless communication system using a different radio access technique and a capability information receiving unit that receives capability information from the user equipment. When the capability information related to simultaneous communication with the first wireless communication system and the second wireless communication system is received from the user equipment, the communication control unit configures the simultaneous communication in the user equipment on the basis of the received capability information.

Effect of the Invention

According to the invention, it is possible to achieve simultaneous communication with a plurality of wireless communication systems using different radio access techniques.

MODE(S) FOR CARRYING OUT THE INVENTION

Hereinafter, embodiments of the invention will be described with reference to the drawings.

The following embodiment discloses a user equipment that can simultaneously communicate with a plurality of wireless communication systems using different radio access techniques (RATs). The following embodiment will be described in brief. Capability information that is used only for simultaneous communication and can be recognized by each wireless communication system in which simultaneous communication is configured is defined. According to this structure, a base station in the wireless communication system can configure simultaneous communication with other wireless communication systems in the user equipment, without understanding the capability information defined according to different RATs of other wireless communication systems. In addition, capability information that is used for only the simultaneous communication between the wireless communication systems using different RATs may be defined, considering the total processing capability of the user equipment.

Figure 2:
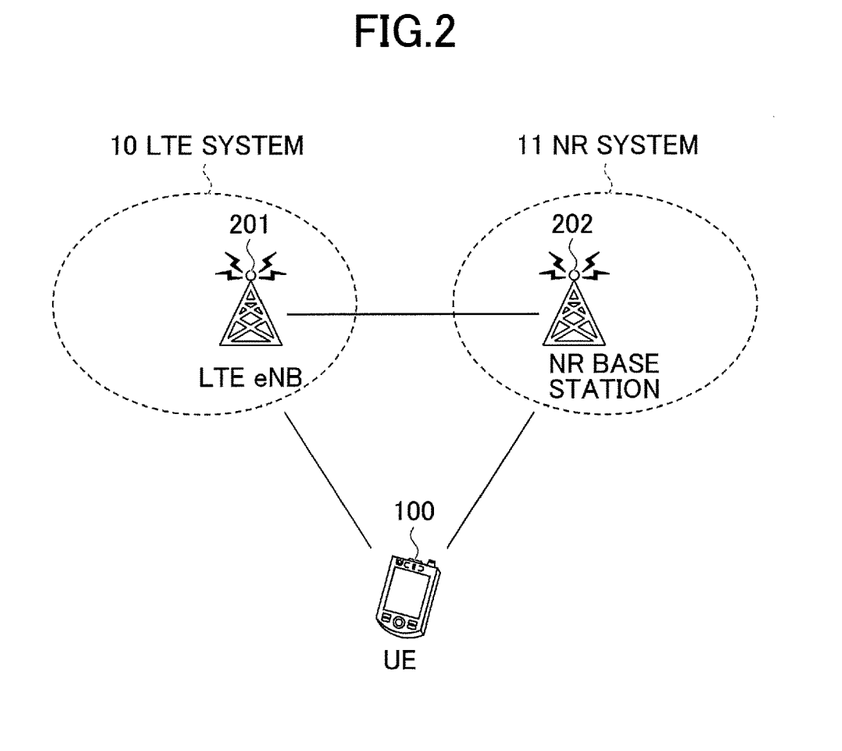
FIG. 2 is a diagram schematically illustrating a wireless communication system according to an embodiment of the invention.

First, a wireless communication system according to an embodiment of the invention will be described with reference to FIG. 2. FIG. 2 is a diagram schematically illustrating the wireless communication system according to the embodiment of the invention.

As illustrated in FIG. 2, an LTE system 10 and an NR system 11 include an LTE base station 201 and an NR base station 202, respectively. A user equipment 100 can wirelessly communicate with both the LTE system 10 and the NR system 11. In the following embodiment, the user equipment 100 can perform simultaneous communication (LTE-NR dual connectivity) with the LTE base station 201 and the NR base station 202.

For example, when the user equipment 100 communicates with the LTE base station 201 before LTE-NR dual connectivity is configured, the LTE base station 201 acquires capability information from the user equipment 100 and determines whether the user equipment 100 supports an LTE-NR dual connectivity function, on the basis of the capability information. When the user equipment 100 supports the LTE-NR dual connectivity function, the LTE base station 201 can configure LTE-NR dual connectivity during communication with the user equipment 100 and direct the user equipment 100 to simultaneously communicate with the NR base station 202 and the LTE base station. In this case, the LTE base station 201 functions as a master base station that controls the LTE-NR dual connectivity and the NR base station 202 functions as a secondary base station providing a secondary cell which is additionally configured. When the LTE-NR dual connectivity is configured, the user equipment 100 can transmit and/or receives radio signals, simultaneously using a master cell provided by the LTE base station 201 and a secondary cell provided by the NR base station 202.

Specifically, in downlink transmission, the LTE base station 201 functioning as a master base station divides a packet sequence to be addressed to the user equipment 100, which has been received from a core network (not illustrated), into a packet sequence to be transmitted from the LTE base station 201 to the user equipment 100 and a packet sequence to be transmitted to the user equipment 100 through the NR base station 202, according to a configured division ratio. Then, the LTE base station 201 transmits the former packet sequence to the user equipment 100 and transmits the latter packet sequence to the NR base station 202. When receiving the transmitted packet sequence, the NR base station 202 transmits the received packet sequence to the user equipment 100. Then, the user equipment 100 can combine the packet sequence received from the LTE base station 201 with the packet sequence received from the NR base station 202 to form the packet sequence transmitted from the core network.

In contrast, in uplink transmission, the user equipment 100 divides the packet sequence to be transmitted into a packet sequence to be addressed to the LTE base station 201 and a packet sequence to be addressed to the NR base station 202 according to a configured division ratio. Then, the user equipment 100 transmits the former packet sequence to the LTE base station 201 and transmits the latter packet sequence to the NR base station 202. When receiving the packet sequence from the user equipment 100, the NR base station 202 transmits the received packet sequence to the LTE base station 201. When receiving the packet sequence transmitted from the NR base station 202, the LTE base station 201 can combine the packet sequence received from the user equipment 100 with the packet sequence transmitted from the NR base station 202 to form the packet sequence transmitted from the user equipment 100.

Here, the division ratio is typically configured by the LTE base station 201 that functions as a master base station on the basis of the capability information acquired from the user equipment 100. In the above description, the LTE base station 201 functions as a master base station and the NR base station 202 functions as a secondary base station. However, the invention is not limited thereto. The LTE base station 201 may function as the secondary base station and the NR base station 202 may function as the master base station. In addition, the invention is not limited to the LTE-NR dual connectivity and can be applied to cooperative communication including simultaneous communication between the wireless communication systems using different radio access techniques (RATs).

Figure 3:
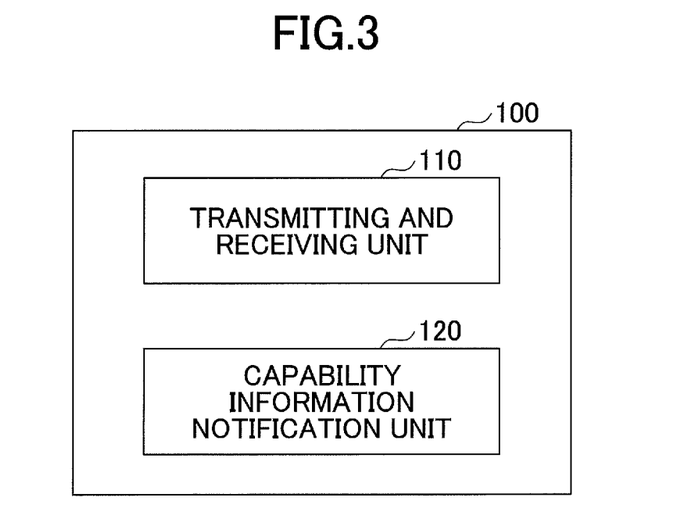
FIG. 3 is a block diagram illustrating the functional structure of a user equipment according to an embodiment of the invention.

Next, the user equipment according to the embodiment of the invention will be described with reference to FIG. 3. FIG. 3 is a block diagram illustrating the functional structure of the user equipment according to the embodiment of the invention.

As illustrated in FIG. 3, the user equipment 100 includes a transmitting and receiving unit 110 and a capability information notification unit 120.

The transmitting and receiving unit 110 transmits and receives radio signals to and from the LTE base station 201 in the LTE system 10 and the NR base station 202 in the NR system 11. Specifically, the transmitting and receiving unit 110 transmits and receives various downlink and/or uplink signals to and from the LTE base station 201 and the NR base station 202. For example, the downlink signals include a downlink data signal and a downlink control signal and the uplink signals include an uplink data signal and an uplink control signal. When the LTE base station 201 or the NR base station 202 configures the LTE-NR dual connectivity function in the user equipment 100, the transmitting and receiving unit 110 transmits and receives radio signals to and from the LTE base station 201 and the NR base station 202, simultaneously using the cell provided by the LTE base station 201 and the cell provided by the NR base station 202.

The capability information notification unit 120 transmits, to the LTE base station 201 or the NR base station 202, capability information related to simultaneous communication with the LTE system 10 and the NR system 11. For example, when wireless communication is established with one of the LTE base station 201 and the NR base station 202, the capability information notification unit 120 transmits, to the LTE base station 201 or the NR base station 202, capability information indicating various user capabilities including the capability information related to LTE-NR dual connectivity. For the capability information related to LTE-NR dual connectivity, for example, a UE category that is used for only the LTE-NR dual connectivity may be defined in the LTE standard and the NR standard. That is, capability information related to the LTE-NR dual connectivity that can be recognized by both the LTE system 10 and the NR system 11 is defined, independently of capability information related to LTE-LTE dual connectivity between a plurality of LTE base stations 201 in the LTE system 10 and capability information related to NR-NR dual connectivity between a plurality of NR base stations 202 in the NR system 11. According to this structure, the LTE base station 201 or the NR base station 202 can recognize the capability information related to the LTE-NR dual connectivity, without understanding the capability information (for example, a UE category) of the other wireless communication system 10 or 11.

For example, when the user equipment 100 that supports the LTE-NR dual connectivity function communicates with the LTE base station 201, the capability information notification unit 120 transmits, to the LTE base station 201, capability information indicating various user capabilities of the user equipment 100 related to communication (for example, LTE-LTE dual connectivity) in the LTE system 10 defined by the LTE standard and capability information indicating various user capabilities of the user equipment 100 related to LTE-NR dual connectivity defined by both the LTE standard and the NR standard. The LTE base station 201 or the NR base station 202 configures LTE-NR dual connectivity in the user equipment 100 on the basis of the received capability information.

Here, it is preferable to define the capability information related to LTE-NR dual connectivity, considering the total processing capability of the user equipment 100 rather than the sum of the transmission and reception capability of the user equipment 100 in the LTE system 10 and the transmission and reception capability of the user equipment 100 in the NR system 11. For example, it is assumed that the peak rate of the user equipment 100 in the LTE system 10 is 1 Gbps and the peak rate of the user equipment 100 in the NR system 11 is 2 Gbps. In this case, the peak rate may be defined, considering the processing capability of the user equipment 100, such that the peak rate in communication with the LTE system 10 in LTE-NR dual connectivity is less than 1 Gbps (for example, 500 Mbps) and the peak rate in communication with the NR system 11 in LTE-NR dual connectivity is less than 2 Gbps (for example, 1 Gbps).

It is considered that the capability information related to LTE-NR dual connectivity can be defined by some approaches. In an embodiment, the capability information may include LTE-side capability information related to the individual transmission or reception of radio signals to or from the LTE system 10 in LTE-NR dual connectivity and NR-side capability information related to the individual transmission or reception of radio signals to or from the NR system 11 in LTE-NR dual connectivity. For example, for the peak rate of the user equipment 100 in LTE-NR dual connectivity, both an individual peak rate (for example, 500 Mbps in the above-mentioned example) in transmission or reception between the LTE base station 201 and the user equipment 100 and an individual peak rate (for example, 1 Gbps in the above-mentioned example) in transmission or reception between the NR base station 202 and the user equipment 100 may be transmitted (notified) as the capability information.

Specifically, parameters (for example, Maximum number of DL-SCH transport block bits received within a TTI, Maximum number of UL-SCH transport block bits transmitted within a TTI, Maximum number of bits of a DL-SCH transport block received within a TTI, Maximum number of bits of a UL-SCH transport block transmitted within a TTI, Total number of soft channel bits (DL), and total layer 2 buffer size in the LTE standard) related to the transmission and reception of radio signals to and from the LTE system 10 in LTE-NR dual connectivity may be transmitted (notified) as the peak rate in transmission or reception between the LTE base station 201 and the user equipment 100 and parameters (for example, Maximum number of DL-SCH transport block bits received within a TTI, Maximum number of UL-SCH transport block bits transmitted within a TTI, Maximum number of bits of a DL-SCH transport block received within a TTI, Maximum number of bits of a UL-SCH transport block transmitted within a TTI, Total number of soft channel bits (DL), and total layer 2 buffer size in the above-mentioned LTE standard) related to the transmission and reception of radio signals to and from the NR system 11 in LTE-NR dual connectivity may be transmitted (notified) as the peak rate in transmission or reception between the NR base station 202 and the user equipment 100.

Alternatively, as another embodiment, the capability information may include total capability information indicating the total transmission or reception of radio signals to or from the LTE system 10 and the NR system 11 in LTE-NR dual connectivity. For example, for the peak rate of the user equipment 100 in LTE-NR dual connectivity, the peak rate (for example, 500 Mbps+1 Gbps=1.5 Gbps in the above-mentioned example) in the total transmission or reception including transmission or reception between the LTE base station 201 and the user equipment 100 and transmission or reception between the NR base station 202 and the user equipment 100 may be transmitted (notified) as the capability information.

Specifically, parameters (for example, Maximum number of DL-SCH transport block bits received within a TTI, Maximum number of UL-SCH transport block bits transmitted within a TTI, Maximum number of bits of a DL-SCH transport block received within a TTI, Maximum number of bits of a UL-SCH transport block transmitted within a TTI, Total number of soft channel bits (DL), and total layer 2 buffer size in the LTE standard) related to the total transmission and reception of radio signals to and from the LTE system 10 and the NR system 11 in LTE-NR dual connectivity may be transmitted (notified) as the peak rate in the total transmission or reception between the user equipment 100 and the LTE and NR base stations 201 and 202 in LTE-NR dual connectivity.

In the above-described embodiment, the capability information related to LTE-NR dual connectivity has been described using the peak rate. However, the capability information related to LTE-NR dual connectivity according to the invention is not limited to the peak rate. For example, the capability information related to LTE-NR dual connectivity may include the number of multiple-input multiple-output (MIMO) layers, the number of robust header compression contexts (ROHCs), or the number of coordinated multiple point (CoMP) channel state information (CSI) processes in LTE-NR dual connectivity.

Similarly to the above-mentioned peak rate, for example, both the number of individual MIMO layers, the number of ROHC contexts, or the number of CoMP CSI processes in the transmission or reception between the LTE base station 201 and the user equipment 100 and the number of individual MIMO layers, the number of ROHC contexts, or the number of CoMP CSI processes in the transmission or reception between the NR base station 202 and the user equipment 100 may be transmitted (notified) as the capability information including the number of MIMO layers, the number of ROHC contexts, or the number of CoMP CSI processes in the user equipment 100 in LTE-NR dual connectivity. Alternatively, the number of MIMO layers, the number of ROHC contexts, or the number of CoMP CSI processes in the total transmission or reception including the transmission or reception between the LTE base station 201 and the user equipment 100 and the transmission or reception between the NR base station 202 and the user equipment 100 may be transmitted (notified) as the capability information including the number of MIMO layers, the number of ROHC contexts, or the number of CoMP CSI processes in the user equipment 100 in LTE-NR dual connectivity.

Figure 4:
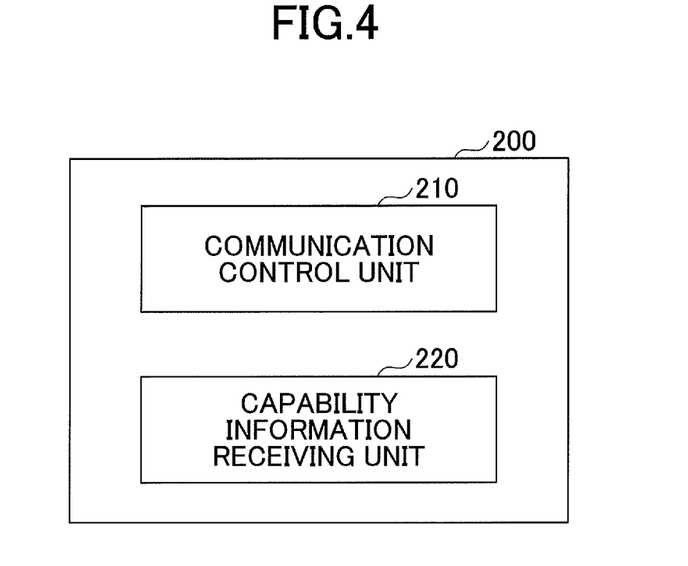
FIG. 4 is a block diagram illustrating the functional structure of a base station according to an embodiment of the invention.

Next, the base station according to the embodiment of the invention will be described with reference to FIG. 4. FIG. 4 is a block diagram illustrating the functional structure of the base station according to the embodiment of the invention. In this embodiment, a case in which the LTE base station 201 that communicates with the user equipment 100 supporting the LTE-NR dual connectivity function functions as a master base station and configures LTE-NR dual connectivity to the NR base station 202 in the user equipment 100 will be described. However, the invention is not limited thereto. It will be readily understood by those skilled in the art that the invention can be applied to a case in which the NR base station 202 functions as a master base station.

As illustrated in FIG. 4, the LTE base station 201 includes a communication control unit 210 and a capability information receiving unit 220.

The communication control unit 210 controls the communication between the user equipment 100 and the NR base station 202 in the NR system 11. That is, the communication control unit 210 controls wireless communication with the user equipment 100 and controls communication with the NR base station 202. When the capability information related to LTE-NR dual connectivity is received from the user equipment 100, the communication control unit 210 configures LTE-NR dual connectivity in the user equipment 100 on the basis of the received capability information. That is, when it is determined that the user equipment 100 supports the LTE-NR dual connectivity function on the basis of the capability information received from the user equipment 100, the communication control unit 210 configures LTE-NR dual connectivity to the NR base station 202 in the user equipment 100.

Specifically, the communication control unit 210 determines the configuration information of LTE-NR dual connectivity including the data division ratio between the LTE base station 201 and the NR base station 202 in LTE-NR dual connectivity on the basis of the received capability information and transmits, to the NR base station 202, the configuration information.

In downlink transmission, the communication control unit 210 divides the packet sequence addressed to the user equipment 100, which has been received from the core network, into a packet sequence to be transmitted from the LTE base station 201 to the user equipment 100 and a packet sequence to be transmitted to the user equipment 100 through the NR base station 202 according to the determined data division ratio, transmits the former packet sequence to the user equipment 100, and transmits the latter packet sequence to the NR base station 202. In contrast, in uplink transmission, the communication control unit 210 transmits, to the user equipment 100, the determined data division ratio and instructs the user equipment 100 to divide a packet sequence according to the data division ratio and to transmit the divided packet sequences. The communication control unit 210 receives one packet sequence, which has been divided according to the data division ratio and then transmitted to the LTE base station 201, from the user equipment 100, receives the other packet sequence, which has been transmitted from the user equipment 100 to the NR base station 202, from the NR base station 202, and combines the packet sequences into the packet sequence transmitted from the user equipment 100.

The capability information receiving unit 220 receives the capability information from the user equipment 100. Specifically, when wireless communication with the user equipment 100 is established before LTE-NR dual connectivity is configured, the capability information receiving unit 220 receives capability information indicating various user capabilities including the capability information related to LTE-NR dual connectivity from the user equipment 100. For the capability information related to LTE-NR dual connectivity, for example, a UE category used for only LTE-NR dual connectivity may be defined in both the LTE standard and the NR standard. That is, capability information related to LTE-NR dual connectivity which can be recognized by both the LTE system 10 and the NR system 11 is defined separately from capability information related to LTE-LTE dual connectivity and capability information related to NR-NR dual connectivity. Therefore, the LTE base station 201 and the NR base station 202 can recognize the capability information related to LTE-NR dual connectivity, without understanding the capability information (for example, a UE category) of the other wireless communication system 10 or 11.

The capability information related to LTE-NR dual connectivity can be defined by some approaches. In an embodiment, the capability information may include LTE-side capability information related to the individual transmission or reception of radio signals to or from the LTE system 10 in LTE-NR dual connectivity and NR-side capability information related to the individual transmission or reception of radio signals to or from the NR system 11 in LTE-NR dual connectivity. In this case, the capability information receiving unit 220 receives, as the capability information, at least one of an individual peak rate, the number of MIMO layers, the number of ROHC contexts, and the number of CoMP CSI processes in the transmission or reception between the LTE base station 201 and the user equipment 100 and at least one of an individual peak rate, the number of MIMO layers, the number of ROHC contexts, and the number of CoMP CSI processes in the transmission or reception between the NR base station 202 and the user equipment 100 in LTE-NR dual connectivity.

In another embodiment, the capability information may include total capability information related to the total transmission or reception of radio signals to or from the LTE system 10 and the NR system 11 in LTE-NR dual connectivity. In this case, the capability information receiving unit 220 receives, as the capability information, at least one of the peak rate, the number of MIMO layers, the number of ROHC contexts, and the number of CoMP CSI processes in the transmission or reception between the user equipment 100 and the LTE and NR base stations 201 and 202 in LTE-NR dual connectivity.

Figure 5:
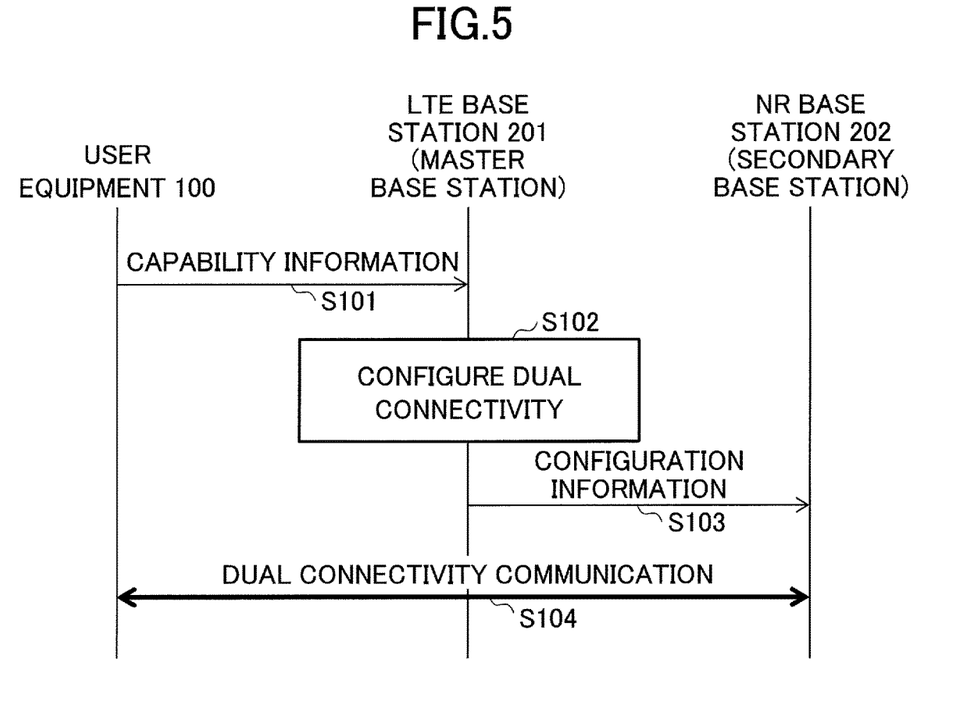
FIG. 5 is a sequence diagram illustrating dual connectivity communication according to an embodiment of the invention.

Next, an LTE-NR dual connectivity process according to an embodiment of the invention will be described with reference to FIG. 5. FIG. 5 is a sequence diagram illustrating dual connectivity communication according to the embodiment of the invention. In this embodiment, a case in which the LTE base station 201 that communicates with the user equipment 100 before LTE-NR dual connectivity is configured functions as a master base station and configures LTE-NR dual connectivity to the NR base station 202 will be described. However, the invention is not limited thereto. It will be readily understood by those skilled in the art that the invention can be applied to a case in which the NR base station 202 functions as a master base station.

As illustrated in FIG. 5, in Step S101, the user equipment 100 transmits capability information to the LTE base station 201.

In Step S102, when detecting that the user equipment 100 supports the LTE-NR dual connectivity function on the basis of the received capability information, the LTE base station 201 configures LTE-NR dual connectivity in which the NR base station 202 is a secondary base station in the user equipment 100.

In Step S103, the LTE base station 201 transmits, to the NR base station 202, the configuration information of LTE-NR dual connectivity. The configuration information may include, for example, information related to the user equipment 100 and the data division ratio between the LTE base station 201 and the NR base station 202.

In Step S104, LTE-NR dual connectivity communication is performed among the user equipment 100, the LTE base station 201, and the NR base station 202.

In the above-described embodiment, the LTE-NR dual connectivity between the LTE base station 201 and the NR base station 202 has been described. However, the invention is not limited thereto. The invention can be applied to any cooperative communication including simultaneous communication between wireless communication systems using different radio access techniques (RATs).

For example, in the above-described embodiment, total capability information indicating the total transmission or reception of radio signals to or from the LTE system 10 and the NR system 11 in LTE-NR dual connectivity has been described. In the present invention, however, total transmitting and receiving capability indicating total transmission or reception of the user equipment 100 may be defined without depending on types and/or the number of multiple RATS (e.g., NR, LTE, UMTS (Universal Mobile Telecommunications System). Further, capability information indicating total transmitting and receiving capability of the user equipment 100 may be transmitted to the serving base station 200 without depending on the RAT combination for the simultaneous transmission (dual connectivity). Upon receiving the capability information, the serving base station 200 may divide the total transmitting and receiving capability of the user equipment 100 to be used in RATs in which the dual connectivity is configured, and uplink packets and/or downlink packets may be divided between the master base station and the secondary base station according to the dividing ratio. For example, it is assumed that the user equipment 100, which supports three RATs including NR, LTE and UMTS, transmits, as the total transmitting and receiving capability, capability information indicating a peak rate of 1.5 Gbps to the serving base station 200, and that the user equipment 100 supports dual connectivity between LTE and UMTS (UMTS-LTE dual connectivity) and dual connectivity between NR and LTE (LTE-NR dual connectivity). In this case, when configuring (setting) UMTS-LTE dual connectivity in the user equipment 100, the serving base station 200 may configure (set) the dividing ratio between LTE and UMTS within a range of the received total transmitting and receiving capability. For example, a peak rate of 500 Mbps may be configured (set) for the UMTS side and a peak rate of 1 Gbps may be configured (set) for the LTE side. Similarly, when configuring (setting) LTE-NR dual connectivity in the user equipment 100, the serving base station 200 may configure (set) the dividing ratio between NR and LTE within a range of the received total transmitting and receiving capability. For example, a peak rate of 500 Mbps may be configured (set) for the LTE side and a peak rate of 1 Gbps may be configured (set) for the NR side.

The block diagrams used to describe the above-mentioned embodiment illustrate functional unit blocks. The functional blocks (components) are implemented by an arbitrary combination of hardware and/or software. In addition, a means for implementing each functional block is not particularly limited. That is, each functional block may be implemented by one device that is physically and/or logically coupled or by a plurality of devices that are physically and/or logically separated from each other and are connected directly and/or indirectly (for example, in a wired manner and/or wirelessly).

Figure 6:
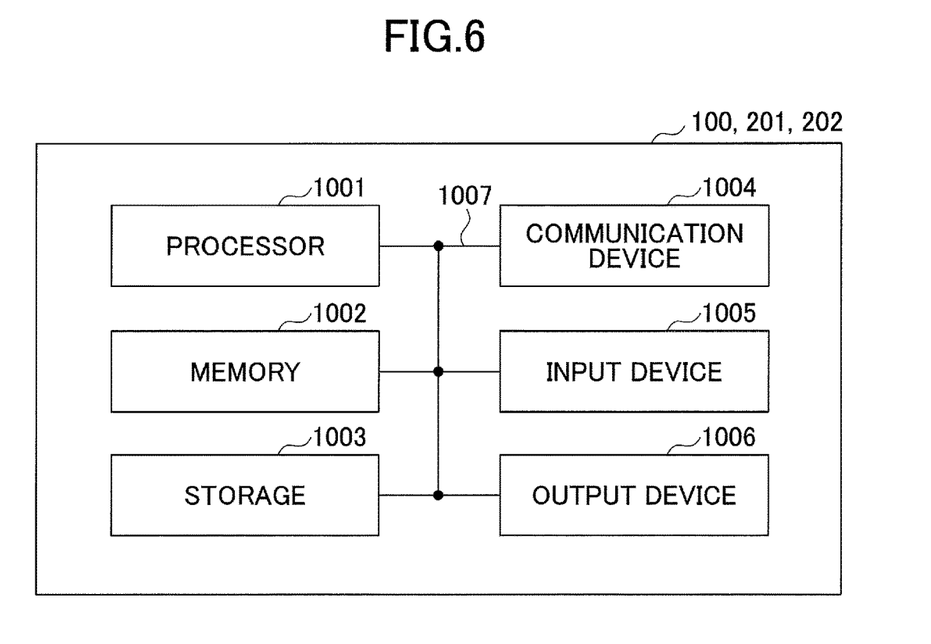
FIG. 6 is a block diagram illustrating the hardware configuration of a user equipment and a base station according to an embodiment of the invention.

For example, the user equipment 100 and the base stations 201 and 202 according to the embodiment of the invention may function as a computer that performs the processes of the wireless communication method according to the invention. FIG. 13 is a block diagram illustrating the hardware configuration of the user equipment 100 and the base stations 201 and 202 according to the embodiment of the invention. Each of the user equipment 100 and the base stations 201 and 202 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, and a unit. The hardware configuration of the user equipment 100 and the base stations 201 and 202 may include one or a plurality of devices illustrated in FIG. 6 or may not include some of the devices.

Each function of the user equipment 100 and the base stations 201 and 202 may be implemented by the following process: predetermined software (program) is read onto hardware, such as the processor 1001 or the memory 1002, and the processor 1001 performs an operation to control the communication of the communication device 1004 or the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, each of the devices may be implemented by the processor 1001.

The processor 1001 reads a program (program code), a software module, or data from the storage 1003 and/or the communication device 1004 to the memory 1002 and performs various types of processes according to the program, the software module, or the data. A program that causes a computer to perform at least some of the operations described in the embodiment is used as the program. For example, the processes performed by each component of the user equipment 100 and the base stations 201 and 202 may be implemented by a control program that is stored in the memory 1002 and is executed by the processor 1001. Other functional blocks may be implemented by the same method as described above. In this embodiment, the above-mentioned various processes are performed by one processor 1001. However, the processes may be simultaneously or sequentially performed by two or more processors 1001. The processor 1001 may be mounted with one or more chips. The program may be transmitted from the network through an electric communication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may also be referred to as, for example, a register, a cache, or a main memory (main storage device). The memory 1002 can store, for example, a program (program code) and a software module that can be executed to perform the wireless communication method according to the embodiment of the invention.

The storage 1003 is a computer-readable recording medium and may include, for example, at least one of an optical disc, such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may also be referred to as an auxiliary storage device. The above-mentioned storage medium may be, for example, a database, a server, and other proper media including the memory 1002 and/or the storage 1003.

The communication device 1004 is hardware (transmitting and receiving device) for communicating with the computer through a wired and/or wireless network and is also referred to as, for example, a network device, a network controller, a network card, or a communication module. For example, the transmitting and receiving unit 110, the capability information notification unit 120, the communication control unit 210, and the capability information receiving unit 220 may be implemented by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs an output process to the outside. The input device 1005 and the output device 1006 may be integrated with each other (for example, a touch panel).

All of the devices, such as the processor 1001 and the memory 1002, are connected to each other by the bus 1007 for information communication. The bus 1007 may be a single bus or the devices may be connected to each other by different buses.

The user equipment 100 and the base stations 201 and 202 may include hardware, such as a microprocessor, a digital signal processor (DSP), an application specific integrated circuit (ASIC), a programmable logic device (PLD), and a field programmable gate array (FPGA), or some or all of the functional blocks may be implemented by the hardware. For example, the processor 1001 may be mounted with at least one of these hardware components.

The transmission (notification) of information is not limited to the aspects/embodiments described in the specification and may be performed by other methods. For example, the transmission (notification) of information may be performed by physical layer signaling (for example, downlink control information (DCI) and uplink control information (UCI)), higher layer signaling (for example, radio resource control (RRC) signaling, medium access control (MAC) signaling, and broadcast information (a master information block (MIB) and a system information block (SIB))), other signals, or combinations thereof. The RRC signaling may also be referred to as an RRC message and may be, for example, an RRC connection setup message or an RRC connection reconfiguration message.

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), and other proper systems and/or next-generation systems that are extended on the basis of these systems.

In each aspect/embodiment described in the specification, for example, the order of the processes in the procedure, the sequence, and the flowchart may be changed as long as there is no contraction between the processes. For example, for the method described in the specification, elements of various steps are presented in the exemplified order. However, the invention is not limited to the presented specific order.

In the specification, in some cases, the specific operations performed by the base stations 201 and 202 are performed by an upper node of the base stations. In a network having one or a plurality of network nodes including the base stations, it is apparent that various operations performed for communication with a terminal can be performed by the base station and/or a network node (for example, MME or S-GW is considered and the network node is not limited thereto) other than the base station. In the above-mentioned example, one network node is provided other than the base station. However, a plurality of other network nodes (for example, MME and S-GW) may be combined with each other.

For example, information can be output from a higher layer (or a lower layer) to a lower layer (or a higher layer). Information may be input and output through a plurality of network nodes.

For example, the input and output information may be stored in a specific place (for example, a memory) or may be managed by a management table. For example, the input and output information can be overwritten, updated, or additionally written. For example, the output information may be deleted. For example, the input information may be transmitted to other devices.

Determination may be performed by a one-bit value (0 or 1), a Boolean value (true or false), or the comparison between values (for example, comparison with a predetermined value).

The aspects/embodiments described in the specification may be independently used, may be combined with each other, or may be changed in association with execution. The transmission (notification) of predetermined information (for example, "notification that the predetermined information is X") is not limited to explicit transmission (notification) and may be implicit transmission (notification) (for example, the predetermined information is not transmitted).

The invention has been described in detail above. It will be apparent to those skilled in the art that the invention is not limited to the embodiments described in the specification. Various modifications and changes of the invention can be made without departing from the scope and spirit of the invention which are defined by the claims. Therefore, the specification is illustrative and does not limit the invention.

Software can be construed broadly to mean, for example, a command, a command set, a code, a code segment, a program code, a program, a sub-program, a software module, an application, a software application, a software package, a routine, a sub-routine, an object, an executable file, an execution thread, a procedure, and a function, regardless of whether is referred to as software, firmware, middleware, a microcode, a hardware description language, or other names.

For example, software and commands may be transmitted and received through a transmission medium. For example, when software is transmitted from a website, a server, or other remote sources by a wired technique, such as a coaxial cable, an optical fiber cable, a twisted pair cable, and a digital subscriber line (DSL), and/or a radio technique, such as infrared rays, radio waves, and microwaves, the wired technique and/or the radio technique is included in the definition of the transmission medium.

For example, the information and the signals described in the specification may be represented by any of various different techniques. For example, data, a command, an instruction, information, a signal, a bit, a symbol, and a chip that can be mentioned in the entire description may be represented by a voltage, a current, electromagnetic waves, a magnetic field or magnetic particles, an optical field or a photon, or arbitrary combinations thereof.

The terms described in the specification and/or the terms required for the understanding of the specification may be substituted with the terms with the same or similar meaning. For example, a channel and/or a symbol may be a signal. In addition, a signal may be a message. A component carrier (CC) may be referred to as a carrier frequency or a cell.

The terms "system" and "network" used in the specification are interchangeably used.

For example, the information and the parameters described in the specification may be represented by absolute values, the relative values of predetermined values, or other corresponding information. For example, a radio resource may be indicated by an index.

The above-mentioned parameters may have any names. In some cases, for example, numerical expressions using these parameters are different from the expressions that are explicitly disclosed in the specification. All of various channels (for example, PUCCH and PDCCH) and information elements (for example, TPC) can be identified by proper names. Therefore, various names may be allocated to the various channels and information elements.

The base station can accommodate one or a plurality of (for example, three) cells (also referred to as sectors). When the base station accommodates a plurality of cells, the entire coverage area of the base station may be divided into a plurality of small areas and a communication service may be provided to each of the small areas by a base station sub-system (for example, a small indoor remote radio head (RRH)). The term "cell" or "sector" indicates a portion or the entire coverage area of the base station and/or the base station sub-system that provides the communication service in the coverage. The terms "base station", "eNB", "cell", and "sector" can be interchangeably used in the specification. In some cases, the base station is referred to as a fixed station, NodeB, eNodeB (eNB), an access point, a femtocell, or a small cell.

In some cases, a mobile station is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other proper terms according to operators.

In some cases, the terms "determining" and "determining" used in the specification include various operations. The terms "determining" and "judging" can include, for example, "determination" and "decision" for calculating, computing, processing, deriving, investigating, looking-up (for example, looking-up in a table, a database, or other data structures), and ascertaining operations. In addition, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation.

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. In the specification, it can be considered that two elements are "connected" or "coupled" to each other by using one or more electric wires, a cable, and/or a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

The term "on the basis of" used in the specification does not mean "on the basis of only" unless otherwise stated. In other words, the term "on the basis of" means both "on the basis of only" and "on the basis of at least".

Any reference to elements with the names "first" and "second" used in the specification does not generally limit the number of elements or the order of the elements. These names can be used as a convenient method for distinguishing two or more elements in the specification. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

The terms "including" and "comprising" and the modifications thereof are intended to be inclusive, similarly to the term "having", as long as they are used in the specification or the claims. In addition, the term "or" used in the specification or the claims does not mean exclusive OR.

A radio frame may include one or a plurality of frames in the time domain. One frame or each of a plurality of frames in the time domain may be referred to as a subframe. The subframe may include one or a plurality of slots in the time domain. The slot may include one or a plurality of symbols (for example, OFDM symbols or SC-FDMA symbols) in the time domain. Each of the radio frame, the subframe, the slot, and the symbol indicates a time unit when a signal is transmitted. The radio frame, the subframe, the slot, and the symbol may have different names. For example, the LTE system performs scheduling in which a base station allocates radio resources (for example, a frequency bandwidth or transmission power that can be used in each mobile station) to each mobile station. The minimum time unit of the scheduling may be referred to as a transmission time interval (TTI). For example, one subframe may be referred to as TTI, a plurality of continuous subframes may be referred to as TTI, or one slot may be referred to as TTI. A resource block (RB) is the unit of resource allocation in the time domain and the frequency domain. In the frequency domain, the resource block may include one or a plurality of continuous subcarriers. In the time domain of the resource block, the resource block may include one or a plurality of symbols and may be the length of one slot, one subframe, or one TTI. One TTI or one subframe may include one or a plurality of resource blocks. The structure of the radio frame is just an example and the number of subframes in the radio frame, the number of slots in the subframe, the number of symbols and resource blocks in the slot, and the number of subcarriers in the resource block can be changed in various ways.

The embodiments of the invention have been described in detail above. The invention is not limited to the above-described specific embodiments and various modifications and changes of the invention can be made, without departing from the scope and spirit of the invention described in the claims.

The present application is based on and claims priority to Japanese patent application No. 2016-095633 filed on May 11, 2016, the entire contents of which are hereby incorporated herein by reference.

EXPLANATIONS OF LETTERS OR NUMERALS

10 LTE SYSTEM
11 NR SYSTEM
100 USER EQUIPMENT
110 TRANSMITTING AND RECEIVING UNIT
120 CAPABILITY INFORMATION NOTIFICATION UNIT
201 LTE BASE STATION
202 NR BASE STATION
210 COMMUNICATION CONTROL UNIT
220 CAPABILITY INFORMATION RECEIVING UNIT

The invention claimed is:

1. A user equipment comprising:
a transceiver, coupled to a processor, that transmits and receives radio signals to and from a first base station in a first wireless communication system and a second base station in a second wireless communication system,
wherein the transceiver transmits, to the first base station or the second base station, capability information related to simultaneous communication with the first wireless communication system and the second wireless communication system,
wherein the simultaneous communication in the user equipment is configured by the first base station or the second base station on the basis of the capability information,
wherein a radio access technology (RAT) of the first wireless communication system is New Radio (NR) and a RAT of the second wireless communication system is Long Term Evolution (LTE),
wherein the simultaneous communication uses LTE-NR dual connectivity, and
wherein the capability information is related to a maximum data rate of the user equipment.

2. A base station in a first wireless communication system, comprising:
a processor that controls communication with a user equipment and a second base station in a second wireless communication system using a different radio access technique; and
a receiver that receives capability information from the user equipment,
wherein, when the capability information related to simultaneous communication with the first wireless communication system and the second wireless communication system is received from the user equipment, the processor configures the simultaneous communication in the user equipment on the basis of the received capability information,
wherein a radio access technology (RAT) of the first wireless communication system is New Radio (NR) and a RAT of the second wireless communication system is Long Term Evolution (LTE),
wherein the simultaneous communication uses LTE-NR dual connectivity, and
wherein the capability information is related to a maximum data rate of the user equipment.

* * * * *